United States Patent [19]

Paul et al.

[11] Patent Number: 4,880,864

[45] Date of Patent: Nov. 14, 1989

[54] THERMOPLASTIC POLYCARBONATES AND BLENDS WITH ENHANCED FLAME RETARDANT PROPERTIES

[75] Inventors: Winfried G. Paul; Ronald L. Price; Sivaram Krishnan, all of Pittsburgh, Pa.

[73] Assignee: Mobay Corporation, Pittsburgh, Pa.

[21] Appl. No.: 138,982

[22] Filed: Dec. 29, 1987

[51] Int. Cl.$^4$ .............................................. C08K 3/38
[52] U.S. Cl. .................................. 524/404; 524/408; 524/409; 524/410; 524/413; 524/414; 524/415; 524/424; 524/425; 524/436; 524/437; 524/443
[58] Field of Search .............. 524/404, 408, 409, 410, 524/413, 414, 415, 424, 425, 436, 437, 443

[56] References Cited

U.S. PATENT DOCUMENTS

| | | | |
|---|---|---|---|
| 3,189,662 | 6/1965 | Vaughn | 260/824 |
| 3,334,154 | 8/1967 | Kim | 260/860 |
| 3,382,207 | 5/1968 | Jaquiss | 260/45.7 |
| 3,419,634 | 12/1968 | Vaughn | 260/824 |
| 3,535,300 | 10/1970 | Gable | 260/29.1 |
| 3,751,400 | 8/1973 | Crennan et al. | 260/47 |
| 3,775,367 | 11/1973 | Nouvertne | 260/45.9 |
| 3,821,325 | 6/1974 | Merritt et al. | 260/824 |
| 3,832,419 | 8/1974 | Merritt, Jr. | 260/824 |
| 3,836,490 | 9/1974 | Bockmann et al. | 260/18 TN |
| 4,110,299 | 8/1978 | Mark | 260/37 |
| 4,223,100 | 9/1980 | Reinert | 525/146 |
| 4,584,360 | 4/1986 | Paul et al. | 528/14 |
| 4,767,818 | 8/1988 | Boutni | 524/505 |

FOREIGN PATENT DOCUMENTS 1370744 10/1974 United Kingdom .
1516544 7/1978 United Kingdom .
8000084 1/1980 World Int. Prop. O. .

Primary Examiner—Melvyn I. Marquis
Attorney, Agent, or Firm—Gene Harsh; Joseph C. Gil; Aron Preis

[57] ABSTRACT

It has now been found that the flame retardance of polydiorganosiloxane copolycarbonates may be significantly improved upon the addition thereto of a small amount of a metal salt of an inorganic acid. The polydiorganosiloxane copolycarbonates are conforming structurally to

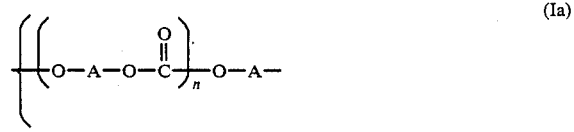

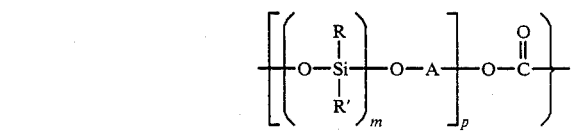

wherein
 p is an integer of from 1 to about 10,
 n is an integer of from 1 to about 1000,
 m is an integer of from 1 to about 500,
 A is a derivative of an aromatic dihydroxy compound,
 R and R' independently denote a $C_1$–$C_{20}$ alkyl radical or a $C_6$–$C_{14}$ aryl radical, which copolymer is characterized in that its relative viscosity measured on a solution of 0.5 g in 100 ml of dichloromethane at 25° C. is at least 1.15.

10 Claims, No Drawings

THERMOPLASTIC POLYCARBONATES AND BLENDS WITH ENHANCED FLAME RETARDANT PROPERTIES

FIELD OF THE INVENTION

The invention is directed to a thermoplastic polycarbonate composition and more particularly to a flame retardant copolycarbonate containing siloxane structured units in its molecular chains.

BACKGROUND OF THE INVENTION

Aromatic polycarbonate resins are well known and are accepted as suitable for a wide variety of uses including injection molding, extrusion and film formation. The chemistry, synthesis, properties, and applications of these polycarbonates are extensively discussed in Chemistry and Physics of Polycarbonates by Schnell, Interscience, 1964 and Polycarbonates by Christopher and Fox, Reinhold, 1962.

Although polycarbonates have some inherent flame resistance, being self-extringuishing, ever more demanding flame retardancy requirements have spawned numerous attempts to increase this property. Among the methods to improve the flame retardance there is noted adding substantial amounts of halogen to polycarbonate resins such as by employing a halogen substituent on the polycarbonate polymer chain (U.S. Patent 3,751,400 and 3,334,154) or adding a monomeric halogenated compound as in U.S. Patent 3,382,207. Also noted, is the approach taguth by U.S. Patent 3,775,367 which entails adding an organic and/or inorganic metal salt to the composition. Additions of perfluoroalkane sulfonic acid salts of alkali metals and organic alkali salts of carboxylic acids have been disclosed in U.S. Patent 3,836,490 and in U.S. Patent 3,775,367. Also noted is German Published Patent No. 2,149,311 which discloses the use of insoluble alkali metal salts, particularly salts of inorganic acids, phosphonic acids and sulphonic acids. Flame rtardant polycarbonate compositions containing alkali metal salts of an inorganic acid are disclosed in U.S. patent 4,223,100. U.S. Patent 3,535,300 discloses the use of small amounts of specified metal salts (which do not include alkali metal salts) in combination with halogen carried on the polymeric backbone or on an additive. U.S. Patent 4,110,299 teaches adding of alkali or alkaline earth metal salts of organic acids in combination with additives such as inorganic halide and an organic monomeric or polyermic aromatic or heterocyclic halide improve the flame retardancy of an aromatic polycarbonate.

Also noted are the teachings in regard to the drip suppression of the compositions when they are exposed to a flame. In German Patent No. 2,535,262 there is a teaching to add fluorinated polyolefins such as polytetrafluoroethylene (PTFE) to a polycarbonate containing organic alkal imetal salt to retard dripping. U.S. Patent 4,110,299 discloses adding to a polycarobnate resin fluorinated polyolefin, fibrous glass or a siloxane, in combination with certain salts and an inorganic halide to diminish tendency to drip. In PCT application WO 80/00084 there is disclosed—in Example 13—a blend of aromatic polycarbonate and a block copolymer of polycarbonate and polydimethylsiloxane (57%/43%) and including sodium salt of trichloro benzene sulfonic acid. The blend was noted to have improved resistance to stress crazing. The document generally discloses improved ductility, solvent resistance and flame retardance characteristics of blends of polycarbonates and a block copolymer of polycarbonate and polydiorganosiloxane.

Polydiorganosiloxane copolycarbonates of the type entailed in the present invention are known.

SUMMARY OF THE INVENTION

It has now been found that the flame retardance of polydiorganosiloxane copolycarbonates may be significantly improved upon the addition thereto of a small amount of a metal salt of an inorganic acid. The polydiorganosiloxane copolycarbonates conforming structurally to

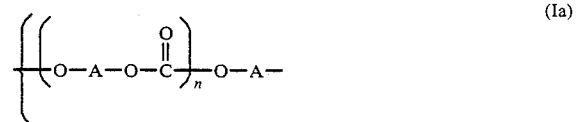

(Ia)

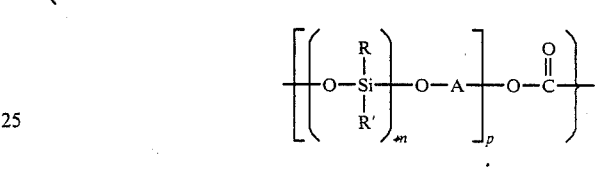

wherein
n is an integer of from 1 to about 1000,
m is an integer of from 1 to about 500,
p is an integer of 1 to 10,
A is a derivative of an aromatic dihydroxy compound,
R and R' independently denote a $C_1$-$C_{20}$ alkyl radical or a $C_6$-$C_{14}$ aryl radical,
which copolymer is characterized in that its relative viscosity measured on a solution of 0.5 g in 100 ml of dichloromethane at 25° C. is at least 1.15.

DETAILED DESCRIPTION OF THE INVENTION

The suitable siloxane copolycarbonates are characterized in that the relative viscosity, measured on a solution of 0.5 g in 100 ml of dichloromethane at 25° C., is at least 1.15 preferably from about 1.18 to about 1.38 and contain about 0.5 to about 60% preferably about 1.0 to about 15% by wt. of polydiorganosiloxane segments. These polydiorganosiloxane segments contain an average of about 5 to about 200 perferably 7 to about 160 silicone atoms per segment. A segment in the present context is a siloxane chain which is not interrupted by a carbon atom.

The polydiorganosiloxane copolycarbonates of the invention are well known in the art. U.S. Patents 3,189,662; 3,419,634; 3,821,325; 3,832,419 and 4,584,360 all contain descriptions of the copolycarbonate and some disclose the method for the preparation. These patents are incorporated herein by reference.

The structure of the copolycarbonate of the invention is

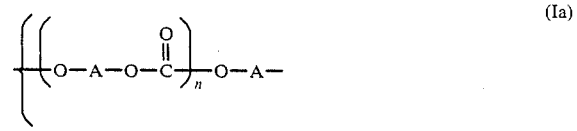

(Ia)

-continued

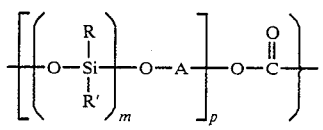

wherein
n is an integer of from 1 to about 1000,
m is an integer of from 1 to about 500,
p is an integer of from 1 to about 10,
A is a derivative of an aromatic dihydroxy compound and
R and R' independently are a $C_1$–$C_{20}$ alkyl or a $C_6$–$C_{14}$ aryl radical. Both the aryl and alkyl radicals may be substituted by halogen atoms.
Most preferred R and R' radicals are selected from the group consisting of methyl, ethyl, propyl, n- and tert.-butyl, chloromethyl, trifluoropropyl, phenyl, chlorophenyl and naphthyl. The block copolymers of the invention comprise about 40 to 99.5, preferably 85 to 99 percent by weight of polycarbonate segments.

The preferred derivatives of diphenol radicals are:

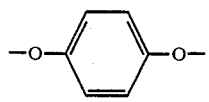 (II)

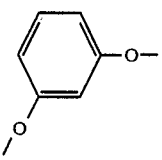 (III)

and

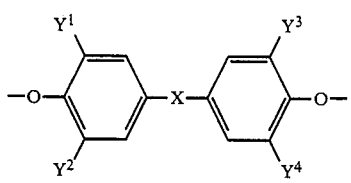 (IV)

wherein X denotes a single bond, —CH$_2$-,

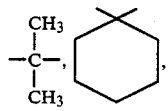

—O—, —S—, —SO$_2$— and

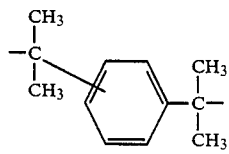

and $Y^1$ to $Y^4$ independently denote a hydrogen atom, $C_1$–$C_4$ alkyl or a halogen atom.

Preferred diphenol radicals are 2,2-bis-(4-hydroxyphenyl)-propane, 1,1-bis-(4-hydroxyphenyl)cyclohexane, 2,2-bis-(3,5-dichloro-4-hydroxyphenyl)propane, 2,2-bis-(3,5-dimethyl-4-hydroxyphenyl)-propane, bis-(3,5-dimethyl-4-hydroxyphenyl)-ethane, bis-(3,5-dimethyl-4-hydroxyphenyl)-methane and bis-(4-hydroxyphenyl) sulphide.

The copolymer may include branching agents and/or termianl groups. Preferred branching agents are compounds having a functionality of at least 3 and are described in DE-OS (German Published Specifications) 1,570,533 and 1,595,762 and in U.S. Patent Specification 3,544,514 which are incorporated herein by reference. These include trihydric phenols, aromatic tricarboxylic acids and hydroxycarboxylic acids having at least three functional groups. Examples of preferred branching agents are 2,4-bis-(4-hydroxyphenyl-isopropyl)-phenol, 2,6-bis-(2'hydroxy-5'-methylbenzyl)-4-methylphenol, 2-(4-hydroxyphenyl)-2-(2,4-dihydroxyphenyl)-propane, 1,4-bis-(4,4'-dihydroxytriphenylmethyl)benzene, 2,4-dihydroxybenzoic acid, trimesic acid, cyanuryl chloride, 3,3-bis-(4-hydroxy-phenyl)-2-oxo-2,3-dihydroindole and 3,3-bis-(4-hydroxy-3-methyl-phenyl)-2-oxo-2,3-dihydroindole.

If the block copolymers are to be employed in branched form, the amount of branching agent is 0.05 to 2 mol % relative to the aromatic dihydroxy components.

The terminal groups for the block copolymer are radicals of phenol, benzoic acid, mono- and dialkylphenols and mono- and dialkylbenzoic acids wherein alkyl substituents contain a total of up to 20 carbon atoms per terminal group. Preferred terminal groups correspond to the formula

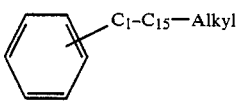 (V)

in which
Z denotes —O— or

Examples of preferred terminal groups are the radicals of phenol, p-tert.-butyl-phenol, p-tert.-octylphenol, p-nonyl-phenol, 3,5-di-tert.-butyl-phenol, 2-(3,5-dimethylheptyl)-phenol and 4-(3,5-dimethylheptyl)-phenol.

In place of free phenols, their halocarbonates may be employed, and in place of the carboxylic acids, their acid chlorides may be employed.

The amount of terminal groups is preferably 1 to 10 mol %, relative to the aromatic dihydroxy component.

The block copolymer may be prepared by the two-phase interfacial process under conventional conditions from alpha,alpha-bis(hydroxyaryloxy)-polydiorganosiloxanes, bisphenols, carbonic acid derivatives, for example phosgene, optionally with chain terminators and/or branching agents. The transesterification process and the process in a homogenous solution are also suitable for the preparation.

The salts useful in the present invention include those formed between alkali metal or alkaline earth metals and inorganic acids. Lithium, sodium, potassium, magnesium, calcium and barium salts are preferred. Inorganic acids in the present context include any compound which meets the traditional tests of acidity and contains a complex ion. Preferred acids contain complex oxo-anions or flur-anions.

The most preferred are the alkali or alkaline-earth metal complex fluoro anion salts or complex oxo-anion salts. This terminology being derived from the discussion of fluorine compounds contained in the text "Advanced Inorganic Chemistry" by F.A. Cotton and G. Wilkinson, Interscience Publishers, 1962, incorporated herein by reference. Suitable inorganic alkali metal complex fluoro anion salts include $KBF_4$, $K_3AlF_6$, $KAlF_4$, $K_2SiF_6$, $Na_3AlF_6$, $KPF_6$, $NaSbF_6$, $Na_3FeF_6$, $NaPF_6$, $Na_2SiF_6$, $Na_2TiF_6$, $NaBF_4$, $K_2TaF_7$, $K_2NbF_7$, $KSbF_6$, $K_2NiF_6$, $K_2TiF_6$, $LiBf_4$, $LiPF_6$, $Li_2BeF_4$, $Li_3AlF_6$, $MgSiF_6$, and $BaSiF_6$.

$Li_3AlF_6$, $BaSiF_6$, $KBF_4$, $K_3AlF_6$, $KAlF_4$, $K_2SiF_6$ and $Na_3AlF_6$ are the preferred metal complex fluoro anion salts, and $Na_3AlF_6$ (cyrolite) is the most preferred complex fluoro anion salt. Among the suitable complex oxo-anion salts are the alkali and alkaline-earth salts of carbonic acid, such as $Na_2CO_3$, $K_2CO_3$, $MgCO_3$, $CaCO_3$, $BaCO_3$ and $BaVO_3$. Other suitable salts are sulfates, phosphates and tungstenates. The most preferred salts of oxo-anion complex acids are $BaCO_3$ and $BaVO_3$.

The salts may be used in any effective amount up to about 2 wt. % based on the total weight of the copolymer. It is preferred to use no less than about 0.05 wt. % and more preferably to use no more than about 1.5% and more preferably no more than 0.8%.

The compositions of the invention may contain conventional additives such as pigments, dyes, UV stabilizers, thermal stabilizers, mold release agents, reinforcing agents and fillers. The compositoins may be formed by any method commonly known in the art. For instance, the various addities may be dry blended with the copolymer pellets and the mixture extruded. In the context of the invention, the copolycarbonates may be blended with a thermoplastic polycarbonate may be essentially siloxane-free. The siloxane content in this blend is preferably between about 0.5 to about 15% by wt.

The invention is further illustrated, but is not intended to be limited by the following examples in which all parts and percentages are by weight unless otherwise specified.

EXAMPLES

Example 1

Several compositions were prepared and their properties evaluated as follows. In the compositions numberes 1-4 - see the following table. Resin A was a polydimethylsiloxane block copolymer containing 5% by weight of siloxane segments having average segment length of 80 and characterized in that its relative viscosity is 1.26–1.27.

|  | 1 | 2 | 3 | 4 |
|---|---|---|---|---|
| Resin A | 99.6 | 99.2 | 98.5 | 100 |
| Cryolite | 0.4 | — | — | — |
| Oligotetrabromo bisphenol A carbonate | — | 0.8 | 1.5 | — |
| Relative Viscosity | 1.257 | 1.271 | 1.259 | 1.267 |
| MFR[1], gms/10 min. | 5.80 | 5.58 | 5.88 | 4.96 |
| Impact Strength Notched Izod |  |  |  |  |
| ⅛ in., ft. lbs/in. | 14.3 | 15.2 | 14.7 | 14.9 |
| ¼ in., ft. lbs/in. | 12.2 | 12.2 | 12.2 | 12.4 |

| -continued |  |  |  |  |
|---|---|---|---|---|
|  | 1 | 2 | 3 | 4 |
| UL-94 Flame Test |  |  |  |  |
| Unaged ⅛ in. |  |  |  |  |
| Class | V-0 | V-0 | V-0 | V-1 |
| Burn time[2] | 2.1 | 2.1 | 2.1 | 5.6 |
| Aged 7 days ⅛ in. |  |  |  |  |
| Class | V-0 | V-0 | V-0 | — |
| Burn time | 2.4 | 2.1 | 1.9 | — |
| Unaged 1/16 in. |  |  |  |  |
| Class | V-0 | V-2 | Fails V-2 | V-2 |
| Burn time | 2.5 | — | — | — |
| Aged 7 days 1/16 in. |  |  |  |  |
| Class | V-0 | (3) | (3) | (3) |
| Burn time | 3.3 |  |  |  |

[1]Melt flow rate in accordance with ASTM D-1238.
[2]Average burning time, seconds.
[3]Failed V-2.

The performance of compositions containing cryolite (composition 1), an oligomeric tetrabromo carbonate (Compositions 2 and 3), was compared to that of the unmodified resin.

As can be seen, the flammability of the resin by itself or when it incorporates known flame retarding agents is inferior to that which is demonstrated by the composition in accordance with the invention. This performance has not been reported or suggested by the prior art.

Example 2

In the Example below there is a direct comparison between Resin A and Makrolon 2508 which is a homopolycarbonate based on bisphenol A, having a relative viscosity of about 1.26. In both compositions there was incorporated 0.40% of cryolite. As the example demonstrates the composition of the invention is superior to the composition based on Makrolon 2508 in term of its flammability rating.

|  | 7 | 8 |
|---|---|---|
| Resin A | — | 99.60 |
| MAKROLON 2508, % | 99.60 | — |
| CYROLITE | 0.40 | 0.40 |
| RELATIVE VISCOSITY | 1.256 | 1.258 |
| MFR, gms/10 min. | 15.70 | 6.3 |
| NOTCHED IZOD IMPACT |  |  |
| ⅛ in., ft lbs/in. | 15.07 | 14.90 |
| ¼ in., ft lbs/in. | 1.81 | 13.27 |
| CRIT THICKNESS, mils | 135 | >470 |
| UL-94 FLAME TEST |  |  |
| ⅛ in. |  |  |
| CLASS | V-1 | V-0 |
| 1/16 in. |  |  |
| CLASS | V-2 | V-0 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition consisting essentially of (1) a polydiorganosiloxane-polycarbonate block copolymer conforming structurally to

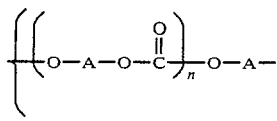 (Ia)

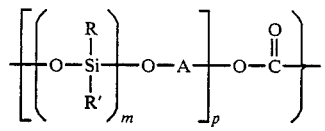

wherein
p is an integer of from 1 to about 10,
n is an integer of from 1 to about 1000,
m is an integer of from 1 to about 500,
A is a derivative of an aromatic dihydroxy compound,
R and R' independently denote a $C_1$–$C_{20}$ alkyl radical or a $C_6$–$C_{14}$ aryl radical, which copolymer is characterized in that its relative viscosity measured on a solution of 0.5 g in 100 ml of dichloromethane at 25° C. is at least 1.15 and (ii) a positive amount of up to 2% by weight of a salt formed between an alkali metal or alkaline earth metal and an inorganic acid which contains a complex ion.

2. The composition of claim 1 wherein said amount is about 0.05 to about 2% by wt. relative to the weight of the composition.

3. The composition of claim 1 wherein said complex ion is an oxo-anion or a fluoro anion.

4. The composition of claim 3 wherien said salt is selected from the group consisting of $KBF_4$, $K_3AlF_6$, $KAlF_6$, $Na_3AlF_6$, $KPF_6$, $NaSbF_6$, $Na_3FeF_6$, $NaPF_6$, $Na_2SiF_6$, $Na_2TiF_6$, $K_2TaF_7$, $K_2NbF_7$, $KSbF_6$, $K_2NiF_6$, $K_2TiF_6$, $LiPF_6$, $Li_2BeF_4$, $Li_3AlF_6$, $MgSiF_6$, $BaSiF_6$, $BaCO_3$ and $BaVO_3$.

5. The composition of cliam 4 wherien said salt is selected from the group consisting of $KBF_4$, $K_3AlF_6$, $KAlF_4$, $K_2SiF_6$, $Na_3AlF_6$, $Li_3AlF_6$ and $BaSiF_6$.

6. The composition of claim 1 wherein said amount is about 0.1 to about 1.5%.

7. The composition of claim 1 wherein said amount is about 0.2 to about 0.8%.

8. The composition of claim 1 wherein said complex ion is an oxo-anion.

9. The composition of claim 1 wherein said metal salt is selected from the group consisting of $Na_2CO_3$, $K_2CO_3$, $MgCO_3$, $CaCO_3$, $BaCO_3$ and $BaVO_3$.

10. The composition of claim 9 wherein said metal salt is $BaCO_3$ or $BaVO_3$.

* * * * *